United States Patent

Dennis, Jr. et al.

[11] 4,054,752
[45] Oct. 18, 1977

[54] CASH REGISTER PROTECTION RECORDING AND ALARM SYSTEM

[76] Inventors: Clay E. Dennis, Jr., 4330 Ferrarra St., Jacksonville, Fla. 32217; Joseph N. Filzen, 5422 Waterside Drive, Jacksonville, Fla. 32210

[21] Appl. No.: 653,713

[22] Filed: Jan. 30, 1976

[51] Int. Cl.² .................................... H04M 11/04
[52] U.S. Cl. ................................ 179/5 R; 340/221
[58] Field of Search ............ 179/5 R, 5 P, 5.5, 2 A; 340/220, 221, 280

[56] References Cited

U.S. PATENT DOCUMENTS

| | | | |
|---|---|---|---|
| 3,036,298 | 5/1962 | Schiller | 340/280 |
| 3,188,392 | 6/1965 | Ferrell | 179/5 R |
| 3,390,234 | 6/1968 | Glidden | 179/5 R |
| 3,391,623 | 7/1968 | Tabankin | 340/280 |
| 3,471,652 | 10/1969 | Moore | 340/221 |
| 3,511,933 | 5/1970 | Holmes | 179/5 R |
| 3,618,060 | 11/1971 | Nina | 179/5 P |
| 3,626,098 | 12/1971 | Lee | 179/5 R |
| 3,634,846 | 1/1972 | Fogiel | 340/221 |
| 3,868,479 | 2/1975 | Schweitzer | 179/5 R |

Primary Examiner—Kathleen H. Claffy
Assistant Examiner—Joseph A. Popek

[57] ABSTRACT

A cash register alarm and recording system is provided which continuously records the audible and/or visual environment in the vicinity of a cash register or other high value location on one channel of a continuous loop tape. A time code is continuously recorded on a second channel of the tape. In the event of an attempted robbery from the cash register operated either by the thief himself or under coercion by an attendant clerk an automatic police alarm device dials the police department and transmits a voice alarm message giving the location of the cash register and the fact that there is an occurrence of a threatened robbery. Simultaneously with the initiation of the alarm message a recorder timer begins its timing cycle. The message of the timing cycle is approximately haif the length of the continuous loop tape. At the end of the timing cycle the recorder stops the loop recorder and the contemporaneously produced video scenes and/or sounds, including conversations in the vicinity of the cash register for the period before, during and after the robbery event are preserved.

8 Claims, 4 Drawing Figures

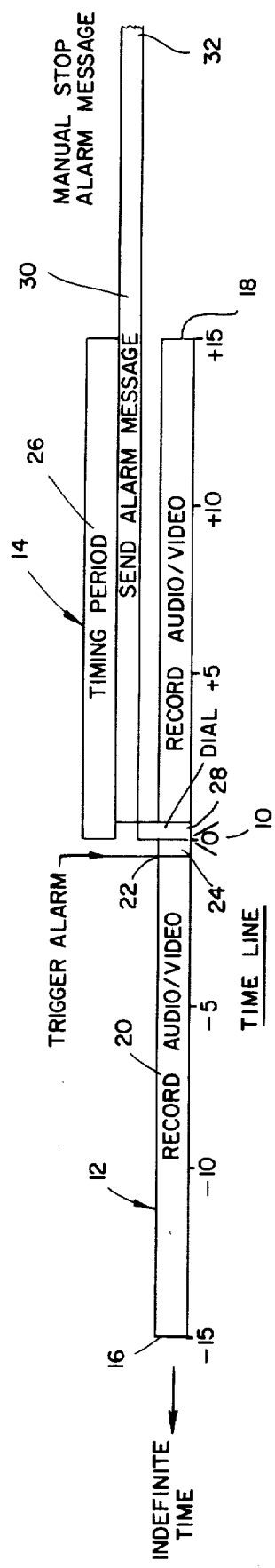
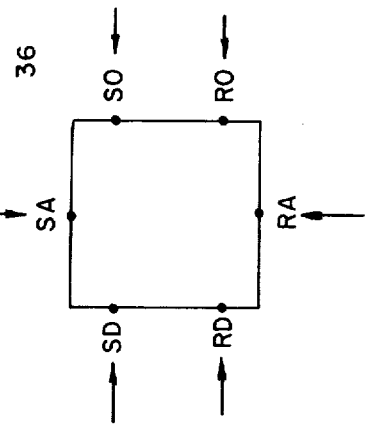
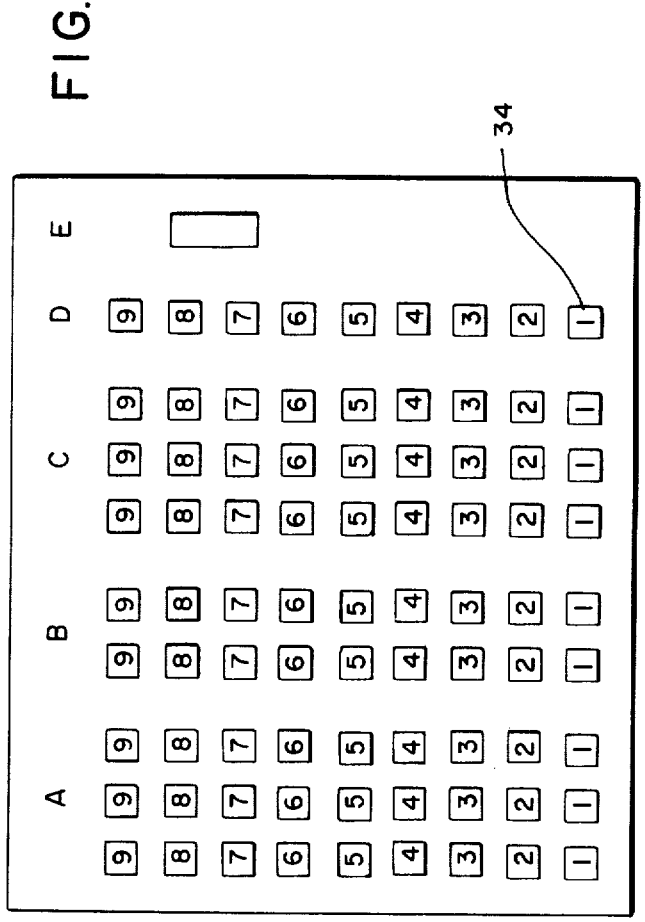

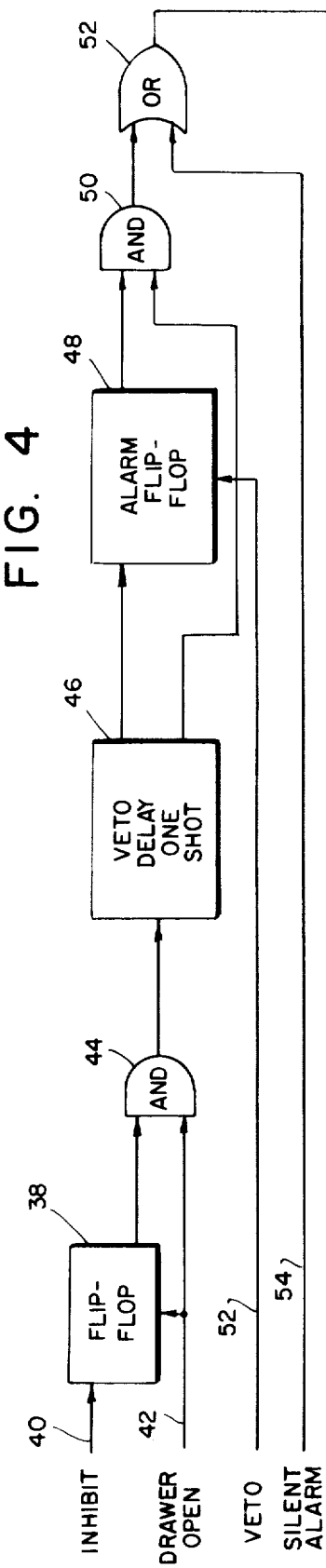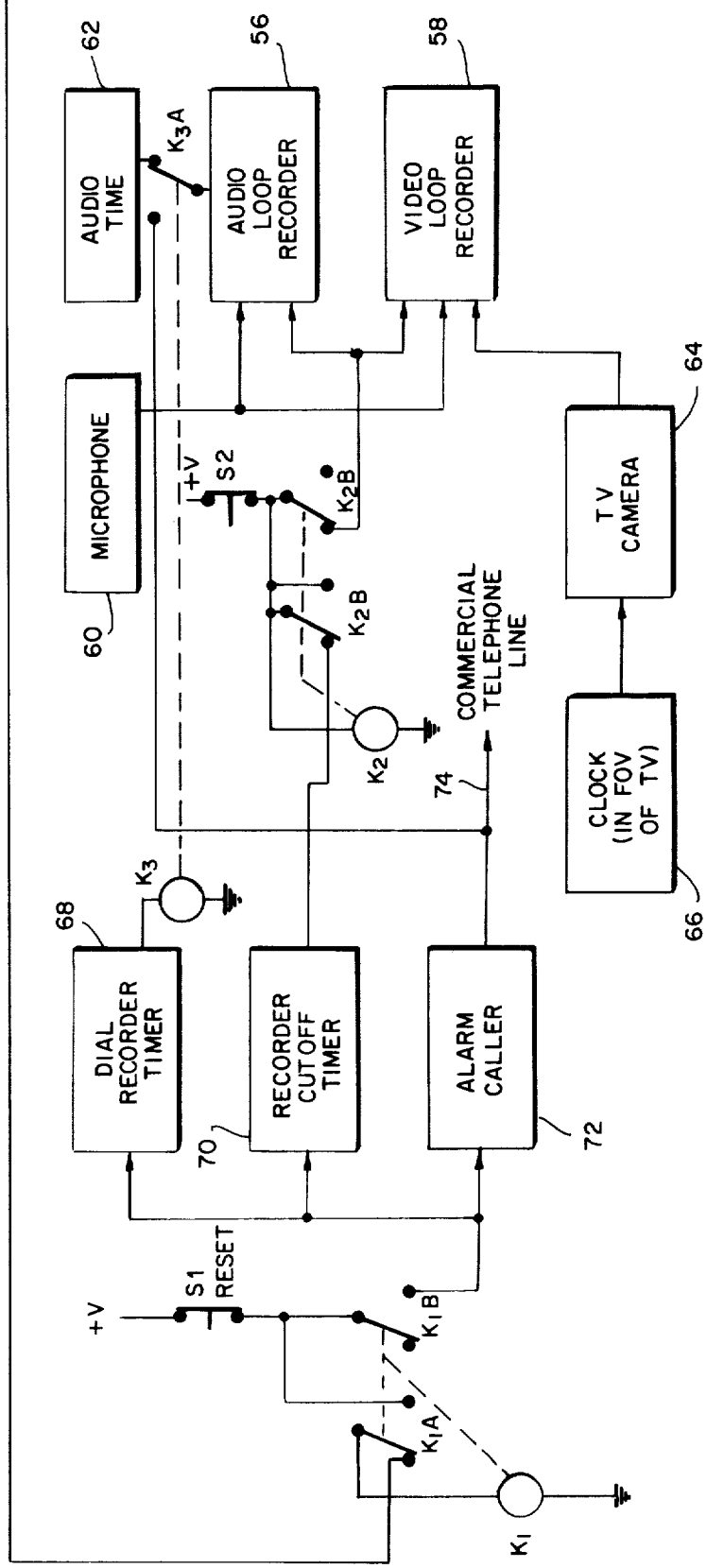
FIG. 4

CASH REGISTER PROTECTION RECORDING AND ALARM SYSTEM

BACKGROUND OF THE INVENTION

The increase in violent crime has had a large and adverse influence on the retail merchant. The availability of currency, even in small quantities, in the cash register of the retail merchant has made him perculiary vulnerable to the unpredictability of the amateur thief and the driving need of the narcotics addict. Retail merchant robberies consequently has an unfortunate record of violence and fatality. "Exact change" policies sometimes coupled with a locked safe, and "credit card only" policies have had notable success in completely halting robberies of bus drivers and service station operators. This success has been at the serious cost of customer convenience and lost business.

Robberies occur only when the thief believes that he has a good chance of getting money and avoiding apprehension and punishment. A number of attempts have been made to make retail robbery less profitable. The familiar slow frame film camera in banks and retail stores has had a beneficial effect. Unfortunately, since these cameras must operate continuously, the need to conserve film has limited their frame rate to a few frames per minute. Many of the details of a robbery transaction are lost in this type of snapshot approach. In addition, the pictures provide only a historical record of the event aiding in identification and prosecution of the perpetrators. There is no provision for summoning assistance while the robbery is in progress to improve the probability of apprehension in the act.

U.S. Pat. No. 3,596,024 in the name of Floyd Smith taught a floor pressure switch which initiated a radio distress call from a recorder. This system required radio receiving equipment at the police station or the office of private security agents. In addition, no provision was made for recording events of the robbery transaction to aid in identification and apprehension of the perpetrators.

U.S. Pat. Nos. 3,678,509 and 3,707,708 in the name of Carlo Dan, teach the use of dedicated telephone lines from the protected premises to a central monitor station. When an intrusion or holdup alarm is generated at the protected premises a reversal in the DC signal previously maintained on the dedicated lines initiated on alarm signal at the central monitor station. Neither of the cited patents dealt with storing data for later use. The cost of dedicated lines and a central monitor station takes this system outside the means of the average merchant.

The prior art fails to teach a low-cost system for triggering a holdup alarm, summoning assistance while the holdup is in progress, and recording audible and/or visual details of the time period centered on the alarm time.

SUMMARY OF THE INVENTION

The present invention teaches a silent alarm generator attached to a cash register which will generate an alarm signal upon opening the cash drawer unless a predetermined sequence of actions is taken by the person opening it. The predetermined sequence of actions can include hitting a certain key or keys in a special sequence, a failing to hit a certain key or keys. After the alarm is triggered, the operator is given a few seconds to veto the alarm by performing the same or a different special sequence before the alarm becomes effective. Once the alarm is effective, the system automatically dials the police department or private security service number and begins transmitting a continuous alarm message containing name and address and other data about the robbery location.

A continuous loop audio and/or video tape recorder is normally in continuous operation at the cash register location. Both recorders are capable of continuous recording by erasing the oldest material on the continuous loop tape. At any instant, the tape recorders contain recorded data for a preceding time period preferably of 10 to 30 minutes in duration. A second audio channel on the audio and/or video tape recorder continuously records a time signal. The time signal is generated locally or is received from a remote location. A convenient remote source of time signals is the U.S. Government Bureau of Standards stations in Maryland, Colorado and Hawaii. These stations broadcast continuously at high power on the followin4 channels (in megahertz): 2.5, 5, 10, 15, 20, 25, 30 and 35. One or more of these stations is receivable at all times in almost any location in the United States. A number of manufacturers produce low-cost receiver circuit boards fixed-tuned to one of these channels. In addition, the Canadian government in Ottawa operates a similarly continuous radio time service in the 7 megahertz band receivable over most of the northeastern and midwestern United States. The time is given by periodic voice announcements between which time ticks accurately mark the seconds. A digital time code is also broadcast. The included time signal is valuable from an evidence standpoint for later courtroom use. An alibi, for example, cannot stand up against an accurate time record simultaneously recorded with the audio and/or video.

In order to get maximum benefit from the recording, it should cover the time preceding the robbery, in order to record the entry and preparatory activities of the perpetrators; the time of the robbery itself centered on the alarm time; and the ensuing time period of record the egress of the perpetrators and possibly to fix on tape the excited utterances of victims and bystanders as an aid to producing an improved record of the robbery transaction, the identity and recollection of witnesses, and other details. In order to preserve the data recorded during this time bracket, the continuously-running magnetic tape recorders need merely be stopped at the end of the post-robbery period. Thus the desired data are not erased to make way for additional recording but instead are preserved on the continuous loop of magnetic tape. The recorders are stopped by a timer whose timing cycle is initiated by the alarm signal.

Inadvertent or mistaken generation of an alarm call to the police department could be embarrassing to the merchant. Thus a short delay is provided after triggering before the generation of an alarm call to enable use of a veto sequence which will cancel the alarm condition.

The safety of the merchant is enhanced by the fact that at no time is an audible or visible alarm signal present in the vicinity of the cash register. Thus, there is no neightening of the perpetrator's nervousness which could lead to injury or death.

BRIEF DESCRIPTION OF THE DRAWINGS

FIG. 1 shows a time-line of the operation of the system centered on the effective time of the alarm;

FIG. 2 shows the keyboard of an illustrative example of a cash register;

FIG. 3 shows a multivibrator with input and output connections labelled according to the convention used in this disclosure; and FIG. 4 contains a functional block diagram of one embodiment of the system.

DETAILED DESCRIPTION OF THE PREFERRED EMBODIMENT

TIME LINE ANALYSIS

The time line of FIG. 1 shows the sequence of events centered about the time of an alarm. The alarm time is shown at 10 as zero. Earlier times 12 than the alarm time 10 have negative coefficients; later times 14 have positive coefficients. In the normal untriggered condition, the time line can be thought of as a continuous loop with the minus 15 minute point 16 and the plus 15 minute point 18 connected together. The alarm time 10 can normally be thought of as representing the position of a recording head on a continuous loop of time. The instant to the left of the alarm time 10 represents the time just past. The instant to the right of the alarm time 10 represents a time preferably 30 minutes previous whose information is about to be erased and covered with new information. The lower track 20 on the time line is continuously recording audio and/or video data.

At the time of triggering 22, the prior 30 minutes time 12 plus time 14 of audio and/or video are captured on tape. After a short veto period 24, during which recording proceeds, the alarm procedure begins if the sequence is not aborted by a veto signal. The time of beginning the alarm procedure coincides with the alarm time 10 previously mentioned. At the alarm time 10, a 15 minute time cycle is begun. In the short period 28 following the alarm time 10, a telephone dialing code of an entirely conventional type is imposed on a standard commerical telephone dial. The dialing code can be of the sequential-impulse (dial) type, the tone-keying type conventionally known by the trademark "touch-tone", or some other type such as dc reversal keying. Note that, during the dialing period 28, the audio/video track 20 is switched to record the dialing action. This sound on the tape provides a marker showing precisely when the alarm was generated as well as providing positive verification that a specific telephone number was dialed. The number dialed by this action can be a police department, private security agency, or other source of assistance. At the end of the dialing period 28, an alarm message 30 is placed on the telephone line. The alarm message can contain voice information about the location of the emergency, the name of the owner and specific recommended actions insofar as they can be foreseen in a prerecorded message. The alarm message is conveniently generated by a continuous-loop tape recorder which will continue to repeat the alarm message until manually interrupted at time 32.

When the timing period 26 ends at the plus 15 minute point 18, it causes the termination of recording on the audio and/or video track 20. The halted tape then contains audio and/or video data from the 15 minute time period preceding the alarm 12, the dialing data in time period 28, and the audio and/or video data from the 15 minute time period following the alarm 14. Having been shut down at this time, the recorders are prevented from continued erasing and recording such that the desired time snapshot would be obliterated.

It will be obvious that other allocations of recording time and other total length of time line are possible without departing from the scope of this invention.

GENERATION OF ALARM SIGNAL

The use of the instant invention does not depend on the particular type of cash register employed by the merchant. Cash registers in use today range from completely mechanical, through electrically operated, to fully integrated digital network types. The present invention can advantageously be used with any of these types. Although the manner in which the electrical signals required by the alarm system are generated will differ between cash register types, the manner in which the signals are utilized by the inventive entity described in this disclosure remains unchanged.

The signals required are, a drawer-open signal, and a confirm-secure signal. The presence or absence of the confirm-secure signal whenever the drawer-open signal occurs determines whether or not an alarm sequence is initiated. The drawer-open signal can be derived, using conventional techniques, by magnetic reed relays or switches actuated by motion of the cash drawer, by the electrical motor or relay signals which release the drawer, or by the digital code which enables drawer release, depending upon the type of cash register.

For purposes of the description which follows, assume that the cash register employed is of the conventional electrically operated, stand-alone type commonly found in retail establishments. A view of the keyboard of a representative cash register of this type is snown in FIG. 2. The number of the item sold is recorded in one to three digits being shown in key section A, the store department from which the item emanated is recorded in one to two digits shown in key section B, the number of the clerk responsible for the sale being recorded in one digit, that is to say by a single key, and shown in key section D of the register. Key section C registers the dollars amount of the sale and plays no part in actuating the alarm system. In addition, there is conventionally a large drawer-open key at E which must be depressed in order to record the transaction and cause the cash drawer to open.

The alarm code may be pressing or leaving unpressed a certain key or combination of keys in section A, B and D. The desired electrical signal can be derived from the normal switch closure, if the cash register keys activate electrical switches, or from special switches installed in the register if the keys normally provide only mechanical motion.

The keying sequence should preferably be kept simple since it is anticipated that it will be performed each time the cash drawer is opened. For example, if one of the clerk keys in section D of the register, indicated as the button key 34, is set aside as an inhibit key. In all normal operation, the inhibit key 34 will always be operated before, or soon after the drawer-open key at F is operated. If operation of the inhibit key 34 is omitted in any drawer-opening sequence the alarm is generated. A second key or combination can be set aside for veto of the alarm in the short veto period after triggering or the same key may be used to veto. Thus, a clerk who is coerced into opening the register by a potential thief may do so in a completely conventional manner unlikely to cause suspicion and heightened nervousness in the perpetrator. He need only omit pressing the inhibit button 34.

A third button or combination can be set aside to give an immediate alarm independently of the open or closed condition of the cash drawer. Corresponding to the conventional silent alarm button, this signal is provided for the occasion where the perpetrator causes the clerk to open the cash drawer on the pretext of an innocent purchase, then reveals his intent to rob. Alternatively the silent alarm may be a foot or knee-operated switch remote from the cash register which the clerk may reach. If the clerk is unable to trigger the system during the robbery this switch enables him to activate the timer and alarm call instantly after the perpetrators leave the premises without requiring him to touch the cash register.

SIGNAL PROCESSING

For enhanced understanding of this disclosure, the convention used to depict bistable multivibrators (called flip flops) are described with reference to FIG. 3.

A multivibrator 36 has four possible inputs and two possible outputs. When a logic 1 is connected to either of the two upper inputs, SD and SA, called set inputs, a logic 1 is produced at the upper output SO called the set output. Whenever a logic 1 appears at the set output, a logic 0 simultaneously appears at the lower output RO, called the reset output. The set input at the upper left side of the box, SD, is effective upon the occurrence of the leading edge of the logic 1 input pulse. Similarly, a reset input at the upper left side of the box, RD, is effective at the leading edge of the logic 1 pulse to reverse the outputs and cause the reset output to change to 1 and the set output to 0. The reset input at the bottom of the box, RA, is effective at the trailing edge of the digital 1 pulse to produce the change in output. Once an output condition is established, it remains until changed by a new input.

FIG. 3 is also used to describe the convention employed with monostable multivibrators (one-shots). A monostable multivibrator is triggered at its set input similarly to a bistable multivibrator except that the set output, normally 0, switches to 1 for a fixed period after being triggered, then automatically reverts to 0. The reset output always exhibits the condition opposite to the set output.

Signal processing is described with reference to the logic diagram shown in FIG. 4. All incoming signals are assumed to be short pulses. A flip-flop 38 receives the inhibit pulse 40 at its set input and the drawer-open pulse 42 at bottom reset input. The reset output of flip-flop 38 and the drawer-open pulse are connected to the two inputs of AND gate 44. If the inhibit pulse 40 has occurred at any time since the last time the drawer-open pulse 42 occurred, flip-flop 38 exhibits a logic 0 at its reset output. This 0 inhibits one input of AND gate 44. Thus, in this condition AND gate 44 provides an inhibit output to succeeding circuits. The end of the drawer-open pulse 42 triggers flip-flop 38 into the reset condition whereby its reset output enables one input of AND gate 44. However, at this time the drawer-open pulse 42 is terminated. Thus no output is generated by AND gate 44 when an inhibit pulse 40 precedes a drawer-open pulse 42. When the inhibit pulse 40 is not received, flip-flop 38 remains in the reset condition established by the end of the drawer-open pulse 42 in the preceding sequence. Thus, the reset output of flip-flop 38 provides an enable input to one input of AND gate 44 while the drawer-open pulse 42 occurs. With both inputs enabled, AND gate 44 produces an enable output.

The veto delay one-shot 46 provides a delay of a few seconds before causing the alarm signal to be generated. Upon triggering, veto delay one-shot 46 provides an enable signal from its set output to the set input of alarm flip-flop 48 and an inhibit signal from its reset output to one input of AND gate 50. Alarm flip-flop 48, triggered into the set condition, provides an enable output from its set output to the second input of AND gate 50. If nothing happens to interrupt the conditions set up in the preceding, at the end of its timing cycle, the reset output of veto delay one-shot 46 returning to the logic 1 condition will enable the first input to AND gate 50. AND gate 50 will thereupon initiate the alarm. The initiation of an alarm can be avoided if, during the timing cycle of veto delay one-shot 46, the operator initiates a veto pulse 52. If the trailing edge of veto pulse 52 occurs before the end of the timing cycle of the veto delay one-shot 46, the veto pulse 52 at the reset input of alarm flip-flop 48 is effective to remove the enable signal previously connected from the set output of alarm flip-flop 48 to one input of AND gate 50. Thus when the enable condition returns to the reset output of veto delay one-shot 46 it will be ineffective to produce an output from AND gate 50.

Assuming that an alarm enable is generated by AND gate 50, the enable signal is connected through OR gate 52 and the normally closed relay contacts K1A to the coil of relay K1. Once relay K1 is energised, a continued relay-energisation path is established to the coil of relay K1 from the supply voltage through the normally closed contacts of a reset switch S1 and the normally open relay contacts K1A. Relay K1 can also be operated directly by a silent alarm signal 54 through OR gate 52 which thus by-passes the logic and veto delay circuits previously described.

It will be understood that the veto feature, while being a useful, novel and desirable improvement to the basic system is not intended to limit the invention as broadly defined. The veto delay one shot 46, alarm flip flop 48 and AND gate 50 could be eliminated or by-passed and the output of AND gate 44 connected directly to an imput of OR gate 52 without departing from the basic invention.

Audio loop recorder 56 and video loop recorder 58 normally receive operating power through the normally closed relay contacts K2A. Audio loop recorder 56 is preferably a two-channel, continuous-loop recorder having a recording capacity of 30 minutes. A continuous-loop cassette type recorder having eight tape channels, operated in four two-channel pairs with automatic switching between channel pairs is a well known commercially available device. Video loop recorder 58 is similarly a commercially known device providing simultaneous recording of audio and visual information preferably having a recording capacity of 30 minutes.

A microphone 60, located in the vicinity of the cash register, is connected to feed an audio signal to one channel of the audio recorder 56 and to the sound channel of the video recorder 58. A source of audio time signals 62 is connected through normally closed relay contacts K3A to a second channel of the audio recorder 56. The source of audio time 62 can be a radio receiver tuned to a constantly broadcast time service, a local clock producing audible time signals, or a wired source of audible time signals. If none of these sources of audible time is available, the audio channel of an entertainment radio or TV station can be recorded. Whenever time correlation is required, reference to the station log will provide time markers.

A TV camera 64 provides TV video to the video loop recorder 58. Time reference may optionally be recorded on the video channel by including a clock 66 of conventional design in the field of view of the TV camera 64.

When alarm relay K1 is energised, the closed contacts K1B begin providing power in parallel to dial recorder timer 68, recorder cutoff timer 70 and alarm caller 72. Dial recorder timer 68 immediately energises relay K3 and holds it in that condition for a few seconds. Contacts K3A of relay K3 are switched to connect the initial part of the output message 74 of alarm caller 72 to the time channel of the audio recorder 56. The initial few seconds of the message on the alarm caller 72 consists of dial pulses or keying tones. The presence of these sounds on the time channel of the audio recorder 56 provides both an exact marker to indicate when the alarm was initiated and a record of the telephone number actually dialed. The timing period of the dial recorder timer 68 could be made long enough to ensure that the first one or two ringing signals are recorded as well as the dialing output 74.

At the end of its timing cycle dial recorder timer 68 allows relay K3 to again become deenergized. Audio timer 62 is again connected through the normally closed relay contacts K3A to the time channel of the audio recorder 56.

Following the dialing action, alarm caller 72 begins transmitting an alarm message 74 on the telephone line containing sufficient information both to summon help and to make it effective when it arrives. The alarm message could contain, for example, (a) name and address of the building containing the cash register, (b) name, address and telephone number of owner, (c) indication that an emergency is in progress, (d) request for assistance, (e) directions for reaching the location, and (F) special data about the location of doors, alleys and fire escapes. As previously described with reference to the time line of FIG. 1, the alarm caller 72 continues transmitting the alarm message message until manually reset. Operating power to the alarm caller 72 is maintained through contacts K1B of energized relay K1 until the relay is manually reset by pressing reset switch S1. When the reset switch S1 is pressed, the energization path to the relay K1 through its normally open contacts K1A is momentarily interrupted allowing relay K1 to be deenergized. Thus the alarm caller 72 becomes deenergized and control of the relay K1 is returned to receiving signals from the OR gate 52.

When the relay K1 becomes energized, recorder cutoff timer 70 begins its timing cycle. At the end of its timing cycle recorder cutoff timer 70 generates a signal through normally closed relay contacts K2B which energizes relay K2. Relay contacts K2A thereupon remove operating power from the audio recorder 56 and video recorder 58 to prevent erasure of the recorded data. Relay contacts K2B maintain the relay K2 in the energized condition until reset by pressing normally closed reset switch S2. After the alarm and recording sequence described, the audio and visual cassettes should be replaced by fresh cassettes before resetting the system by operating the reset switch 52.

Various modifications of the invention may be effected by persons skilled in the art without departing from the scope and principle thereof as defined in the following claims.

What is claimed is:

1. A police alarm and robbery recording system for a telephone subscriber station comprising:
   a. Continuous-loop taping means for continuously recording over a cyclic time interval events occurring in the area of said subscriber station;
   b. a silent alarm generator adapted to generate an alarm signal during an alarm condition, timing means activated by said alarm signal for terminating the recording of events by said continuous-loop tape recording means at the end of a predetermined time period, said time period being shorter than said time interval;
   c. means for recording a time reference signal on said continuous-loop tape recorder; and
   d. an alarm caller operatively connected to said generator for causing a number to be dialed from said telephone station at the beginning of said time period and for transmitting prerecorded business identifying information to said system dialed number.

2. The system of claim 1 wherein said continuous-loop tape recording means is an audio tape loop recorder with associated microphone having at least two simultaneously recordable channels.

3. The system of claim 1 wherein said continuous-loop tape recording means is a television tape loop tape recorder with associated camera and microphone.

4. The system of claim 1 wherein said continuous-loop tape recording means comprises:
   a. an audio tape loop recorder with associated microphone having at least two simultaneously recordable channels; and
   b. a television loop recorder having associated camera and microphone.

5. The system of claim 1 further comprising means for recording the number dialed by said alarm caller on said continuous-loop tape recording means.

6. The system as defined in claim 1 includes a cash register operatively combined with said silent alarm generator causing the latter to generate at least one electrical signal as a consequence of a preselected mode of operation of said register.

7. The system as defined in claim 6 wherein said cash register and said generator are adapted to generate a second electrical signal for cancelling said telephone prerecorded information.

8. The system as defined in claim 1 wherein there is provided a radio receiver adapted to be tuned to a time signal broadcast program, said radio being connected to said means for recording a time reference signal on said continuous-loop tape recorder.

* * * * *